(12) United States Patent
Jesel

(10) Patent No.: US 6,591,713 B2
(45) Date of Patent: Jul. 15, 2003

(54) MODULAR CAMSHAFT ASSEMBLY

(75) Inventor: Daniel H. Jesel, Spring Lake, NJ (US)

(73) Assignee: Jesel, Inc., Lakewood, NJ (US)

( * ) Notice: Subject to any disclaimer, the term of this patent is extended or adjusted under 35 U.S.C. 154(b) by 0 days.

(21) Appl. No.: 09/932,444

(22) Filed: Aug. 20, 2001

(65) Prior Publication Data

US 2002/0020371 A1 Feb. 21, 2002

Related U.S. Application Data

(60) Provisional application No. 60/226,095, filed on Aug. 18, 2000.

(51) Int. Cl.$^7$ .............................. F16H 53/00; B21K 1/12
(52) U.S. Cl. ..................... 74/567; 29/888.1; 123/90.6
(58) Field of Search ............................. 74/567; 29/523, 29/888.1; 123/90.6

(56) References Cited

U.S. PATENT DOCUMENTS

| | | | |
|---|---|---|---|
| 2,791,916 A | | 5/1957 | Kintzing |
| 3,128,638 A | | 4/1964 | King |
| 3,742,656 A | | 7/1973 | Amos |
| 4,450,609 A | | 5/1984 | Hamilton |
| 4,730,952 A | | 3/1988 | Wiley |
| 4,993,282 A | * | 2/1991 | Swars ........................ 74/567 |
| 5,048,366 A | | 9/1991 | Spanio |
| 5,158,049 A | | 10/1992 | Neumann |
| 5,307,708 A | | 5/1994 | Matt |
| 5,307,768 A | | 5/1994 | Beier et al. |
| 5,417,186 A | | 5/1995 | Elrod et al. |
| 5,537,971 A | | 7/1996 | Pong |
| 5,704,316 A | * | 1/1998 | Fujimoto et al. ......... 123/90.17 |
| 5,738,052 A | | 4/1998 | Meurer et al. |
| 5,746,166 A | * | 5/1998 | Valasopoulos ........... 123/90.17 |
| 5,887,557 A | * | 3/1999 | Battlogg ................... 123/90.17 |
| 5,992,265 A | | 11/1999 | Klaar |
| 6,460,504 B1 | * | 10/2002 | Phillips et al. .......... 123/196 R |

FOREIGN PATENT DOCUMENTS

| | | | |
|---|---|---|---|
| DE | 41 21 951 | 12/1992 | |
| DE | 195 20 306 | 12/1996 | |
| DE | 37 17 190 | 12/1998 | |
| EP | 0437664 A1 | * 7/1991 | ................... 74/567 |

* cited by examiner

*Primary Examiner*—Vinh T. Luong
(74) *Attorney, Agent, or Firm*—Pillsbury Winthrop LLP

(57) ABSTRACT

A modular camshaft assembly having an elongated shaft, at least one cam lobe assembly, at least one spacer assembly, and a cam adapter assembly is disclosed. Each cam lobe assembly is selectively secured to the elongated shaft. Each spacer assembly is secured to the elongated shaft, wherein the spacer assembly is selectively positioned adjacent the cam lobe assembly. The cam adapter assembly is secured to the elongated shaft and adapted to connect the modular camshaft assembly to a drive assembly.

5 Claims, 4 Drawing Sheets

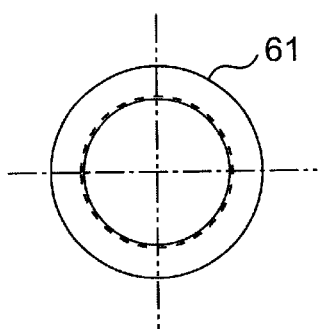
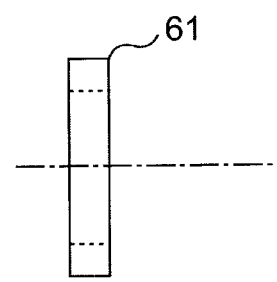
FIG. 2A  FIG. 2B
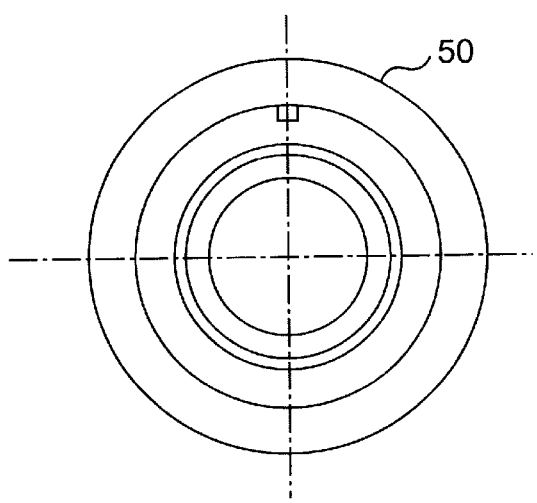
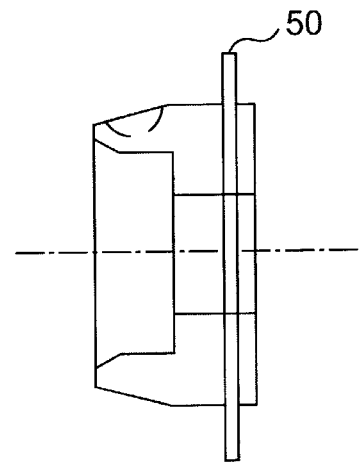
FIG. 3A  FIG. 3B
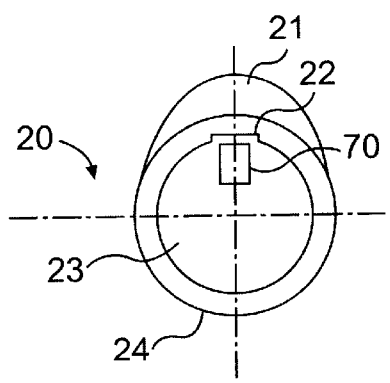
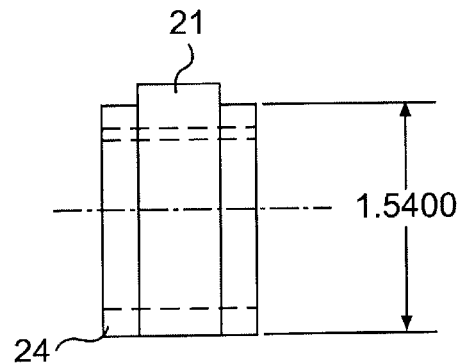
FIG. 4A  FIG. 4B

MODULAR CAMSHAFT ASSEMBLY

This application claims the benefit of U.S. Provisional Application No. 60/226,095, filed Aug. 18, 2000.

FIELD OF THE INVENTION

The present invention relates to a camshaft assembly. In particular, the present invention is directed to a modular camshaft assembly that permits the formation of a camshaft and cam lobes from different materials and allows for adjustment of the cam lobes to vary valve timing.

BACKGROUND OF THE INVENTION

The construction of the camshaft generally is comprised of a cylindrical main body and a plurality of individual cam lobes for the purpose aforenoted. A camshaft as used in automotive engines has typically been machined, shaped for its periphery (becoming a cam surface), using a dedicated machine tool tailored to achieve this end, known as a camshaft shaping or milling machine, or a camshaft shaper or miller. Alternatively, the camshafts can be cast such that the cams and other functional elements are cast integrally with the shaft in one piece. In either case, the manufacture can be complicated. Furthermore, the single piece construction of a camshaft represents a compromise in physical properties. It is desirable for the cam lobes to be wear resistant do to the interaction with other engine components, whereas, it is desirable for the shaft to have high strength and stiffness properties.

One approach to improve the physical properties of the camshaft assembly is to produce the cam lobes and shaft from different materials. A camshaft is called "built-up" when the shaft body and the cams have been produced separately and wherein the essentially finished cams are fixed on the shaft body. Built-up camshafts, for example with a steel tube as the shaft body, can have various installed or attached parts, namely cams, sprocket mountings, sprockets, axial bearings, axial bearing shoulders, and signal emitters, or the like.

U.S. Pat. No. 2,791,916 entitled "Multi-Cam Assembly With Replaceable Cam Units" to Kintzing discloses a multi-cam assembly having replaceable cam units. Each cam unit includes a pair of interfitting parts.

U.S. Pat. No. 5,417,186 entitled "Dual-Acting Apparatus For Variable Valve Timing and the Like" to Elrod et al discloses a camshaft having elongated splines extending along the shaft. A plurality of cam members are positioned along the shaft. Each cam member includes an aperture through which the shaft extends. The aperture includes complementary splines engaging the splines on the shaft to fix the position of the cam member with respect to the shaft.

U.S. Pat. No. 5,537,971 entitled "Modular Crankshaft and Connecting Rod Bearing Assembly" to Pong discloses a modular camshaft assembly having cam lobes that are stamped from sheet metal or made as powdered metal pressings. The cam lobes are then pressed onto a camshaft. The cam lobes frictionally engages the camshaft.

U.S. Pat. No. 5,887,557 entitled "Camshaft With Drive, Bearing and Cam Elements" to Battlogg discloses a camshaft that is formed with two or more central parallel rods. The camshaft elements are mounted on the rods. A drive element is secured to the parallel rods to rotate the camshaft.

U.S. Pat. No. 5,307,708 entitled "Camshaft for Controlling Valves in Internal Combustion Engines" to Matt, U.S. Pat. No. 5,738,052 entitled "Composite Camshaft for Internal Combustion Engine" to Meurer et al., U.S. Pat. No. 5,992,265 entitled "Built-Up Camshaft" to Klaar, German Patent Publications DE 41 21 951 C1, DE 37 17 190 C2 and DE 195 20 306 A1 disclose built-up camshafts in which cam discs are pressed onto a tubular shaft body and are additionally secured in a positive-locking manner in the direction of rotation by, for example, friction.

These camshaft assemblies, however, do not permit easy assembly such that the camshaft assembly can be varied for different engine configurations. Furthermore, these camshaft assemblies do not permit easy repair to replace a worn or damaged cam lobe.

OBJECTS OF THE INVENTION

It is therefore an object of the present invention to provide a modular camshaft assembly having optimized metallurgical properties, wherein different materials are used for different portions of the camshaft assembly for improved performance.

It is another object of the present invention to provide a modular camshaft assembly that permits repair or replacement of a worn or damaged part without replacing the entire camshaft assembly.

It is another object of the present invention to provide a modular camshaft assembly that permits adjustment of individual cam lobes to vary and/or adjust the orientation of individual lobes to vary the timing of individual intake and exhaust valves.

It is another object of the present invention to provide a modular camshaft assembly that provides for interchangeable lobes for varying the camshaft assembly for different engine configurations;

Additional objects and advantages of the invention are set forth, in part, in the description which follows, and, in part, will be apparent to one of ordinary skill in the art from the description and/or practice of the invention.

SUMMARY OF THE INVENTION

In response to the foregoing challenges, applicant has developed an innovative modular camshaft assembly for use with, for example, an engine. The modular camshaft assembly includes an elongated shaft, at least one cam lobe assembly, at least one spacer assembly, and a cam adapter assembly. Each cam lobe assembly is selectively secured to the elongated shaft. Each spacer assembly is secured to the elongated shaft, wherein the spacer assembly is selectively positioned adjacent the cam lobe assembly. The cam adapter assembly is secured to the elongated shaft. The cam adapter assembly is adapted to connect the modular camshaft assembly to a drive assembly.

In accordance with the present invention, the modular camshaft may further include at least one bearing assembly. The at least one bearing assembly may be formed with a ceramic material. Each bearing assembly is positioned on the elongated shaft.

In accordance with the present invention, the modular camshaft assembly may further include an adjustable cam lobe fastener assembly. The cam lobe fastener assembly secures each cam lobe assembly to the elongated shaft to prevent rotation of each cam lobe assembly with respect to the elongated shaft. In accordance with the present invention, the adjustable cam lobe fastener assembly may include a cam lobe fastener for securing each cam lobe assembly to the elongated shaft, and an adjustment assembly for adjusting the position of the cam lobe fastener with respect to the elongated shaft. The cam lobe fastener assembly may include a fastener pin, which engages a recess in the cam lobe assembly. The adjustment assembly may include a plurality of recesses on the elongated shaft. Each recess is adapted to receive the fastener pin. It is contemplated that multiple recesses may be provided for each cam lobe assembly such that the timing of the valve opening may be adjusted by locating the pin in a different recess.

The modular cam shaft assembly in accordance with the present invention may further include a fastener assembly secured to opposite ends of the elongated shaft to prevent removal of each cam lobe assembly, each spacer assembly, and the cam adapter assembly from the elongated shaft.

It is contemplated that the modular camshaft assembly will include multiple cam lobe assemblies spaced along the elongated camshaft. A cam lobe assembly will be provided for each intake valve and for each exhaust valve. At least one spacer will be used to permit proper spacing of the cam lobe assemblies along the elongated shaft. Furthermore, multiple bearings will be provided to permit rotation of the elongated shaft when connected to the engine.

BRIEF DESCRIPTION OF THE DRAWINGS

The invention will be described in conjunction with the following drawings in which like reference numerals designate like elements and wherein:

FIG. 2A is a front view of a first fastener assembly of the modular camshaft assembly of FIG. 1, FIG. 2B is an side view of the fastener of FIG. 2A;

FIG. 3A is a front view of a cam adapter assembly of the modular camshaft assembly of FIG. 1, FIG. 3B is an side view of the fastener of FIG. 3A;

FIG. 4A is a front view of a cam lobe assembly of the modular camshaft assembly of FIG. 1, FIG. 4B is an side view of the cam lobe assembly of FIG. 4A;

DETAILED DESCRIPTION OF THE PREFERRED EMBODIMENTS

Figure 1:
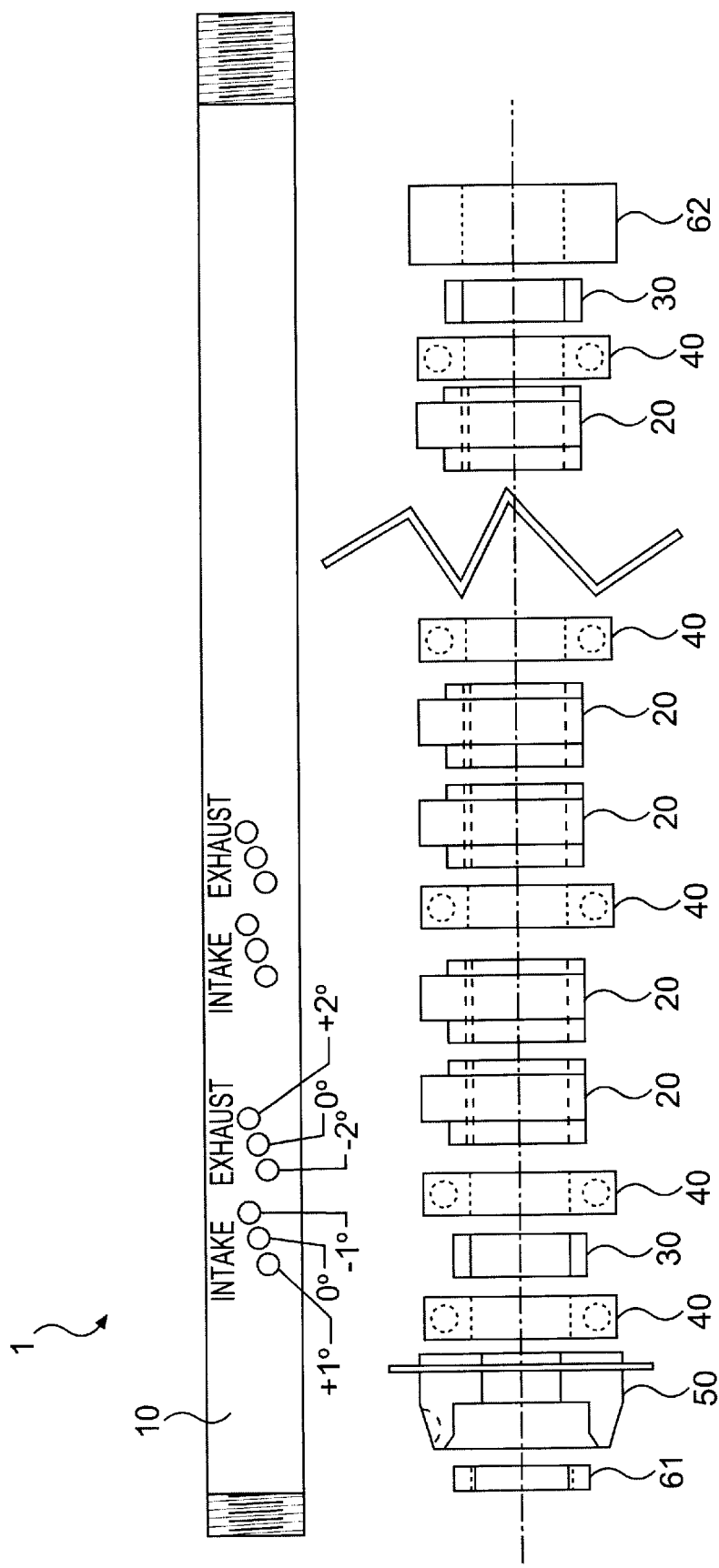
FIG. 1 is an exploded view of a disassembled modular camshaft assembly in accordance with an embodiment of the present invention.
Figures 5A, 5B:
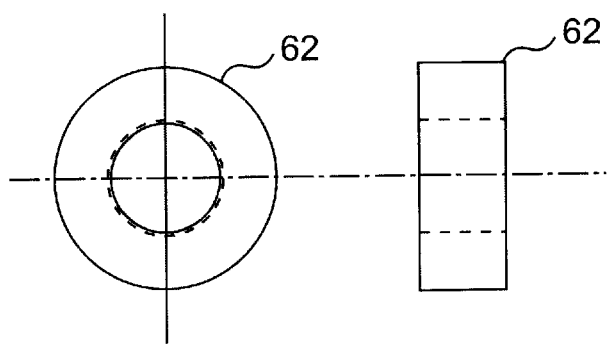
FIG. 5A is a front view of a second fastener assembly of the modular camshaft assembly of FIG. 1.
FIG. 5B is an side view of the second fastener of FIG. 5A.
Figures 6A, 6B:
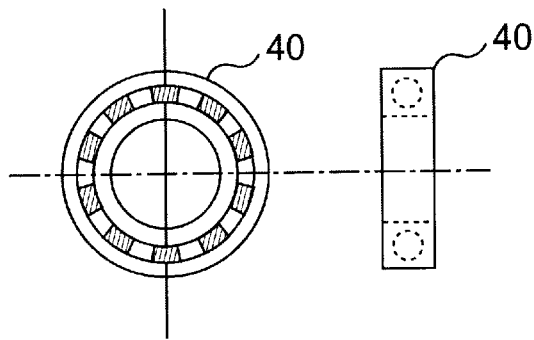
FIG. 6A is a front view of a bearing assembly of the modular camshaft assembly of FIG. 1.
FIG. 6B is an side view of the bearing assembly of FIG. 6A.
Figures 7A, 7B:
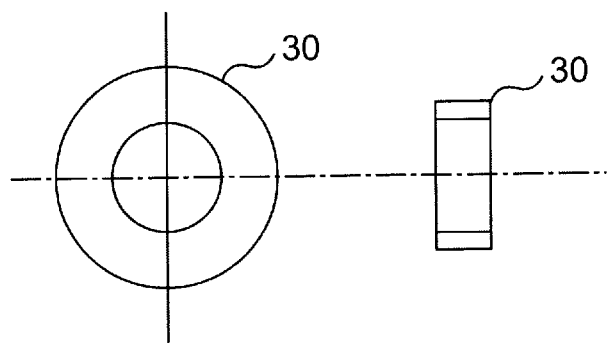
FIG. 7A is a front view of a cam spacer assembly of the modular camshaft assembly of FIG. 1.
FIG. 7B is an side view of the cam spacer assembly of FIG. 7A.
Figure 8:
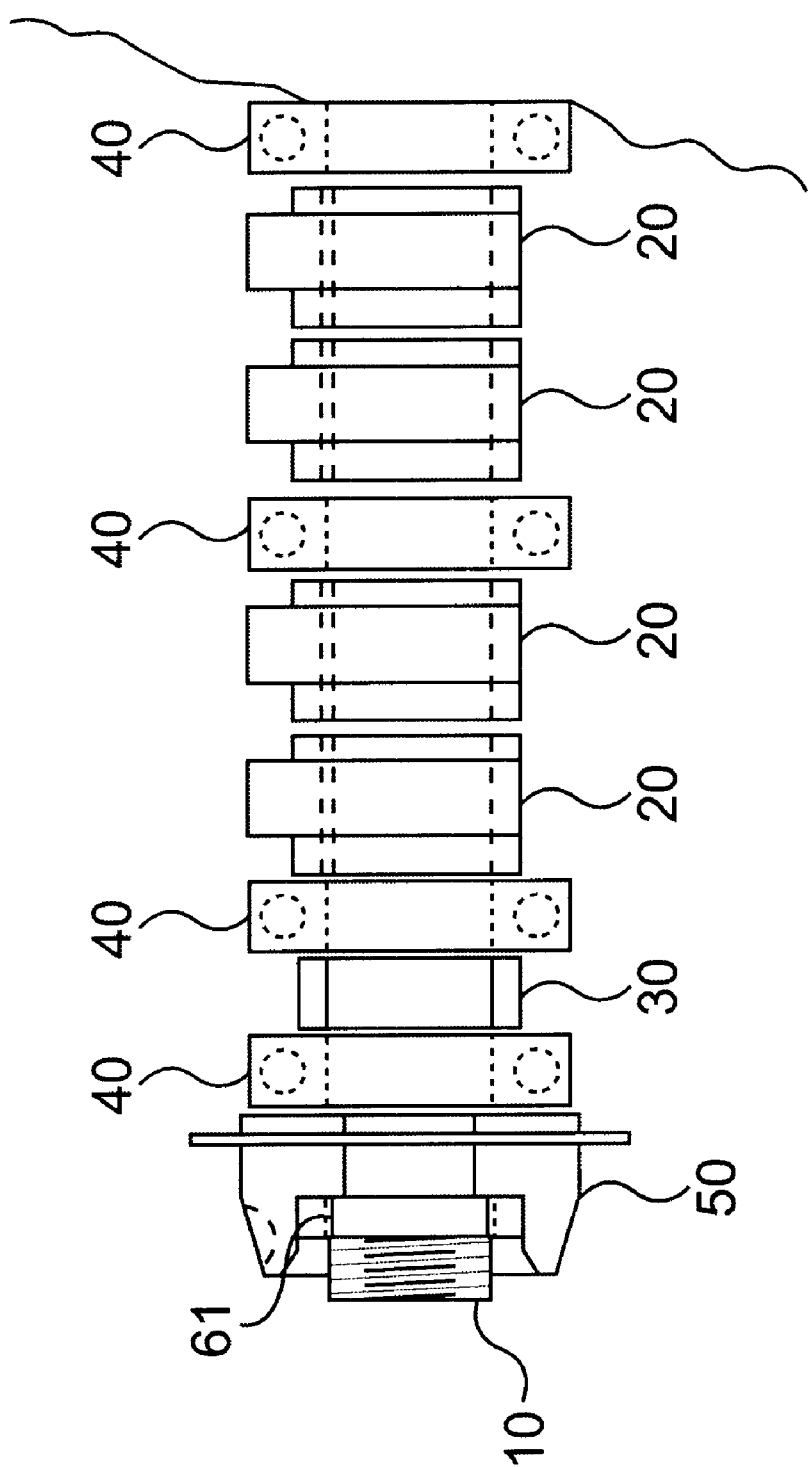
FIG. 8 is a partial side view of the assembled modular camshaft assembly in accordance with the present invention.

Referring now, more particularly to the figures, there is shown in FIGS. 1 and 8 a modular camshaft assembly 1 in accordance with the present invention. The modular camshaft 1 includes an elongated shaft 10, a plurality of cam lobe assemblies 20, a plurality of cam spacer assemblies 30, and a plurality of bearing assemblies 40. The modular camshaft 1 further includes a cam adapter assembly or distributor gear 50 for linking the camshaft assembly 1 to a drive assembly such as a belt or chain drive (not shown). Threaded fasteners 61 and 62 prevent removal of the cam lobe assemblies 20, cam spacer assemblies 30 and bearing assemblies 40.

With the modular camshaft arrangement contemplated by the inventors, the overall metallurgy for the shaft and cam lobes may be optimized, not compromised like unitary camshafts. Different materials are used in the formation of the lobes 20 and shaft 10. The metallurgy for each lobe 20 is optimized for wear and interface with a follower (not shown) of an actuation assembly for transferring the motion of the cam lobe to operate (i.e. open) a valve. It is contemplated that dedicated cam lobe assemblies 20 may be provided to operate intake and exhaust valves associated with each engine cylinder and spaced along the shaft 10. Furthermore, the metallurgy of the shaft 10 is optimized for strength and stiffness. With the modular camshaft arrangement contemplated by the inventors, the heat treatment is also optimized for the individual components rather than compromised for separate features of a one piece unit. As a result, the heat treatment of the lobes may be optimized and tailored to produce a cam lobe having excellent wear resistance. The heat treatment of the camshaft may be optimized and tailored to produce a cam shaft having high strength.

The cam lobe assemblies 20 are positioned along the shaft 10 to correspond to the location of the actuator assemblies for the exhaust and intake valves associated with the engine cylinders. The bearing assemblies 40 are spaced along the shaft 10 between the cam lobe assemblies 20, a shown for example in FIGS. 1 and 8.

The bearing assemblies 40 are preferably ceramic bearings having a narrow construction. The use of multiple bearings 40 along the shaft 10 increases overall cam stiffness because of the relatively short unsupported distances between the bearings. The narrow design of the bearing assemblies 40 in some situations allows for the placement of additional bearing assemblies 40, which increases the load carrying ability of the cam shaft assembly 1. It is contemplated that other bearing assemblies may be used in connection with the present invention. The use of a needle type thrust bearing in connection with the present invention permits assembly within a range of positive to negative clearance. This results in a simplification of the manufacturing of the timing cover assembly or any other cam thrust restraint system by widening the manufacturing tolerances of these systems. The present bearing design is less prone to failure due to oil system deficiencies or failures.

The cam spacer assemblies 30 are spaced along the shaft 10 between the cam lobe assemblies 20 and the bearing assemblies 40 to ensure the proper location of these assemblies along the shaft 10 such that the cam lobe assemblies 20 are aligned with their respective valve actuation assemblies. The axial orientation of the components on the shaft 10 is maintained by the fasteners 61 and 62.

The cam lobe assembly 20 as shown in FIG. 4 includes a single lobe 21 that corresponds to a valve opening event. It is contemplated that the cam lobe assembly 20 may include more than one lobe such that the cam lobe assembly 20 may perform more than one valve opening event. For example, a cam lobe assembly 20 may be provided with a lobe to perform a main exhaust valve opening event and a secondary lobes to perform engine braking and/or exhaust gas recirculation.

The cam lobe assembly 20 includes a recess 22 formed in the central opening 23 through which the shaft 10 extends. The recess 22 is adapted to receive a pin or engaging assembly 70. The pin 70 is adapted to be received within a complementary recess 11 in the shaft 10. A plurality of recesses 11 can be provided for each valve. The position of the cam lobe 21, and thus the timing of the valve opening/closings can thus be adjusted by inserting the pin 70 in a different recess 11. The recesses 11 and pin 70 collectively form a lobe indexing system. The lobe indexing system allows changing of cam timing between intake and exhaust without discarding an entire cam and/or manufacturing a complete new unit. The lobe indexing system also allows individually-tailoring timing to specific cylinders without discarding an entire cam and/or manufacturing a complete new unit.

The present invention provides numerous advantages with regard to the cam lobe assemblies. Base circle run out is minimized due to grinding lobes individually rather than on one long shaft. Attaching the bearings to shaft 10 allows the use of a larger base circle 24 because the lobes need not clear bearing races in the engine block or cylinder head to install the cam. This results in lower pressure angles and increased cam stiffness, which allows for better control of the valve at higher RPMs. The use of taller lobes associated with the larger base circles permits the use of lower ratio rocker arms for the same net valve lift. This reduces load on the camshaft, lobe, lifter, push rod, and rocker arm, providing better durability and higher RPM limits that contribute to possible horsepower gains. This also reduces frictional power losses on these components. Lobe and lifter wear are decreased because of reduction of Hertzian (contact) stresses due to the larger instantaneous radii of curvature of the lobes. Spalling and other bearing related failures are also reduced for the same reason.

The present invention provides numerous advantages from a manufacturing standpoint and improved physical properties. Heat treatment is simplified and can be done by more modern and more consistent methods. Heat treatment is also optimized for the individual components rather than compromised for separate features of a one piece unit. Modular distributor gears are not affected by straightness inconsistencies caused by heat treating of a one-piece camshaft. Distributor gears can be manufactured more easily on modern equipment because they do not have to fixtured as part of a long shaft. Furthermore, the distributor gears 50 can be manufactured to tighter tolerances. As a result, brand new camshafts need not be scrapped because of out-of-tolerance straightness, rather the elongated shaft can be replaced. These tighter tolerances permit drastic improvements in ignition timing. Distributor gears can be supplied in smaller incremental diameters allowing fine-tuning of gear to gear clearances. This can be done without scrapping an entire camshaft to adjust this one feature.

Worn parts can be replaced without replacing the entire cam shaft assembly. Furthermore, a cam lobe may be interchangeable between different engine configurations by purchasing only the shaft and using existing lobes. This results in a inventory reduction for engine builders, race teams, and repair shops.

Manufacturing can be done on less exotic (expensive) machinery with higher precision. Engine assembly is faster and less involved.

It will be apparent to those skilled in the art that various modifications and variations may be made without departing from the scope of the present invention. Thus, it is intended that the present invention covers the modifications and variations of the invention, provided they come within the scope of the appended claims and their equivalents.

What is claimed is:

1. A modular camshaft assembly for use with an engine, said modular camshaft assembly comprising:
    a single elongated shaft;
    at least one cam lobe assembly, wherein each of said at least one cam lobe assembly is fixedly secured to said elongated shaft in one of a plurality of predetermined operating positions, wherein each of the least one cam lobe assembly is secured to the elongated shaft to prevent axial and rotational movement of the cam lobe assembly with respect to the elongated shaft;
    at least one spacer assembly, wherein each of said at least one spacer assembly is secured to said elongated shaft, wherein said at least one spacer assembly is selectively positioned adjacent said at least one cam lobe assembly; and
    a cam adapter assembly secured to said elongated shaft, said cam adapter assembly being adapted to connect said modular camshaft assembly to a drive assembly.

2. The modular camshaft according to claim 1, further comprising:
    at least one bearing assembly, wherein said at least one bearing assembly is positioned on said elongated shaft.

3. The modular camshaft assembly according to claim 1, further comprising:
    an adjustable cam lobe fastener assembly for each of said at least one cam lobe assembly for securing each of said at least one cam lobe assembly to said elongated shaft in one of the predetermined operating positions to prevent rotation of each of said at least one cam lobe assembly with respect to said elongated shaft.

4. The modular cam shaft assembly according to claim 3, wherein said adjustable cam lobe fastener assembly comprises:
    a cam lobe fastener pin for securing each of said at least one cam lobe assembly to said elongated shaft; and
    a plurality of openings formed in the elongated shaft for adjusting the position of said cam lobe fastener with respect to said elongated shaft, wherein each of the openings is sized to selectively receive the cam lobe fastener pin.

5. The modular cam shaft assembly according to claim 1, further comprising a fastener assembly secured to opposite ends of said elongated shaft to prevent removal of said at least one cam lobe assembly, said at least one spacer assembly, and said cam adapter assembly from said elongated shaft.

* * * * *